United States Patent
Yun et al.

(10) Patent No.: US 11,152,618 B2
(45) Date of Patent: Oct. 19, 2021

(54) NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

(71) Applicant: Samsung SDI Co., Ltd., Yongin-si (KR)

(72) Inventors: Pilsang Yun, Yongin-si (KR); Jongmin Kim, Yongin-si (KR); Hyunbeom Kim, Yongin-si (KR); Wooyoung Yang, Yongin-si (KR); Jangsuk Hyun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/462,912

(22) PCT Filed: Dec. 4, 2017

(86) PCT No.: PCT/KR2017/014102
§ 371 (c)(1),
(2) Date: May 21, 2019

(87) PCT Pub. No.: WO2018/101808
PCT Pub. Date: Jun. 7, 2018

(65) Prior Publication Data
US 2019/0326596 A1    Oct. 24, 2019

(30) Foreign Application Priority Data
Dec. 2, 2016 (KR) .......................... 10-2016-0163896

(51) Int. Cl.
*H01M 4/525* (2010.01)
*C01G 53/04* (2006.01)
(Continued)

(52) U.S. Cl.
CPC ............ *H01M 4/525* (2013.01); *C01G 53/04* (2013.01); *H01M 4/505* (2013.01); *H01M 10/052* (2013.01); *H01M 2004/021* (2013.01)

(58) Field of Classification Search
CPC ...... C01G 53/006; C01G 53/42; C01G 53/50; H01M 4/366; H01M 10/052; H01M 4/131; B01J 2/00
(Continued)

(56) References Cited

U.S. PATENT DOCUMENTS 7,309,546 B2    12/2007    Kweon et al.
9,660,291 B2 *   5/2017    Kim ..................... C01G 53/006
(Continued)

FOREIGN PATENT DOCUMENTS

CN    001434527 A    8/2003
CN    102971893 A    3/2013
(Continued)

OTHER PUBLICATIONS

International Search Report for International Application No. PCT/KR2017/014102, dated Mar. 14, 2018, 3pp.
(Continued)

*Primary Examiner* — Khanh T Nguyen
(74) *Attorney, Agent, or Firm* — Lewis Roca Rothgerber Christie LLP (57) ABSTRACT

Provided are a nickel-based active material precursor for a lithium secondary battery including a porous core and a shell on the porous core, the shell having a radial arrangement structure with a higher density than that of the porous core, wherein the nickel-based active material precursor have a
(Continued)

size of 9 μm to 14 μm, and the porous core has a volume of about 5% by volume to about 20% by volume based on the total volume of the nickel-based active material precursor; a method of preparing the nickel-based active material precursor; a nickel-based active material produced from the nickel-based active material; and a lithium secondary battery including a cathode containing the nickel-based active material.

10 Claims, 3 Drawing Sheets

(51) Int. Cl.
  *H01M 4/505* (2010.01)
  *H01M 10/052* (2010.01)
  *H01M 4/02* (2006.01)
(58) Field of Classification Search
  USPC .......................................... 252/500; 429/223
  See application file for complete search history.

(56) References Cited

U.S. PATENT DOCUMENTS

| | | | |
|---|---|---|---|
| 9,837,663 B2 | 12/2017 | Nagai | |
| 10,020,507 B2 | 7/2018 | Kobayashi et al. | |
| 10,581,110 B2 | 3/2020 | Kwon et al. | |
| 2012/0009476 A1* | 1/2012 | Park | H01M 4/131 |
| | | | 429/223 |
| 2013/0149608 A1* | 6/2013 | Kim | C01G 53/50 |
| | | | 429/223 |
| 2014/0050976 A1 | 2/2014 | Nagai | |
| 2014/0158932 A1 | 6/2014 | Sun et al. | |
| 2014/0162126 A1 | 6/2014 | Cho et al. | |
| 2016/0181597 A1 | 6/2016 | Kim et al. | |
| 2016/0190573 A1 | 6/2016 | Sun et al. | |
| 2016/0359165 A1* | 12/2016 | Kim | C01G 53/42 |
| 2017/0222221 A1 | 8/2017 | Park et al. | |
| 2018/0097226 A1 | 4/2018 | Kim et al. | |
| 2018/0108940 A1* | 4/2018 | Kwon | H01M 4/366 |

FOREIGN PATENT DOCUMENTS

| | | | | |
|---|---|---|---|---|
| CN | 103872316 A | | 6/2014 | |
| CN | 104157831 A | * | 11/2014 | ............ H01M 4/131 |
| EP | 2706599 A1 | | 3/2014 | |
| JP | H09110433 A | * | 4/1997 | ................ B01J 2/00 |
| JP | 2001-243951 A | | 9/2001 | |
| JP | 2015-76397 A | | 4/2015 | |
| KR | 10-2013-0063868 A | | 6/2013 | |
| KR | 10-2013-0138073 A | | 12/2013 | |
| KR | 10-2015-0016125 A | | 2/2015 | |
| KR | 10-2015-0026863 A | | 3/2015 | |
| KR | 10-1568263 B1 | | 11/2015 | |
| KR | 10-1593401 B1 | | 2/2016 | |
| KR | 10-2016-0049995 A | | 5/2016 | |
| KR | 10-2016-0129764 A | | 11/2016 | |
| WO | WO 2016-052820 A1 | * | 4/2016 | ........... C01G 53/006 |
| WO | WO 2016-068594 A1 | | 5/2016 | |
| WO | WO 2016-175597 A1 | * | 11/2016 | .......... H01M 10/052 |

OTHER PUBLICATIONS

Korean Office Action dated Jan. 29, 2020, for corresponding Korean Patent Application No. 10-2017-0165237, 6 pages.
EPO Extended Search Report dated Jul. 3, 2020, for corresponding European Patent Application No. 17876566.5 (7 pages).
Office Action (with English translation) dated Aug. 4, 2021, for corresponding Chinese Patent Application 201780074530.2 (18 pages).

* cited by examiner

NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

CROSS-REFERENCE TO RELATED APPLICATION(S)

This application is a National Phase Patent Application of International Patent Application Number PCT/KR2017/014102, filed on Dec. 4, 2017, which claims priority of Korean Patent Application No. 10-2016-0163896, filed Dec. 2, 2016. The entire contents of both of which are incorporated herein by reference.

TECHNICAL FIELD

The present disclosure relates to nickel-based active material precursors for lithium secondary batteries, methods of preparing the same, nickel-based active materials for lithium secondary batteries produced from the nickel-based active material precursor, and lithium secondary batteries including cathodes containing the nickel-based active materials.

BACKGROUND ART

With the development of portable electronic devices, communication devices, and the like, there is an increasing demand for lithium secondary batteries having high energy density.

Lithium nickel manganese cobalt composite oxides, lithium cobalt oxides, and the like have been used as cathode active materials of lithium secondary batteries. However, when such cathode active materials are used, cracks occur in primary particle units with repeated charging and discharging, thereby reducing the long lifespan of lithium secondary batteries, increasing battery resistance, and failing to satisfy desired battery characteristics. Therefore, there is a need to improve these characteristics.

DESCRIPTION OF EMBODIMENTS

Technical Problem

Provided is a nickel-based active material precursor for a lithium secondary battery having an increased lithium ion utilization rate.

Provided is a method of producing the nickel-based active material precursor.

Provided are a nickel-based active material obtained from the nickel-based active material precursor and a lithium secondary battery including a cathode containing the nickel-based active material.

Solution to Problem

According to an aspect of the present disclosure, a nickel-based active material precursor for a lithium secondary battery includes a porous core and a shell having a radial arrangement structure with higher density than that of the porous core.

The nickel-based active material precursor has a particle size of about 9 μm to about 14 μm, and the porous core has a volume of about 5% by volume to about 20% by volume based on the total volume of the nickel-based active material precursor.

According to another aspect of the present disclosure, a method of producing a nickel-based active material precursor for a lithium secondary battery includes:

a first step of forming a porous core by reacting a mixture of a complexing agent, a pH regulator, and a metal raw material for forming a nickel-based active material precursor; and a second step of forming a shell on the porous core obtained in the first step, the shell having a radial arrangement structure with higher density than that of the porous core, wherein a supply rate of the metal raw material for forming a nickel-based active material precursor and the complexing agent in the second step is reduced as compared to that of the first step.

According to another aspect of the present disclosure, a nickel-based active material for a lithium secondary battery is obtained from the nickel-based active material precursor.

According to another aspect of the present disclosure, a lithium secondary battery includes a cathode including the nickel-based active material for a lithium secondary battery.

Advantageous Effects of Disclosure

A nickel-based active material precursor for a lithium secondary battery according to an embodiment has increased efficiency as a lithium diffusion distance is decreased. By using a cathode including a nickel-based active material obtained from the nickel-based active material precursor, a lithium secondary battery having increased discharge capacity and improved charge/discharge efficiency may be manufactured.

REFERENCE NUMERALS

| 21: Lithium secondary battery | 22: Negative electrode |
|---|---|
| 23: Positive electrode | 24: Separator |
| 25: Battery case | 26: Cap assembly |

MODE OF DISCLOSURE

Hereinafter, a nickel-based active material precursor for a lithium secondary battery, a method of producing the same, a nickel-based active material produced from the nickel-based active material precursor, and a lithium secondary battery including a cathode containing the nickel-based active material according to an embodiment of the present disclosure will be described in detail with reference to the accompanying drawings.

Figure 1A:
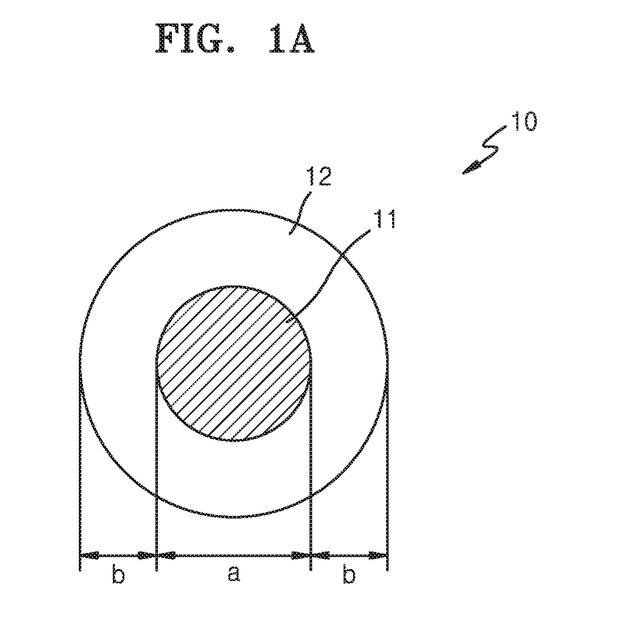
FIG. 1A is a schematic diagram illustrating a structure of a nickel-based active material precursor according to an embodiment.
Figure 1B:
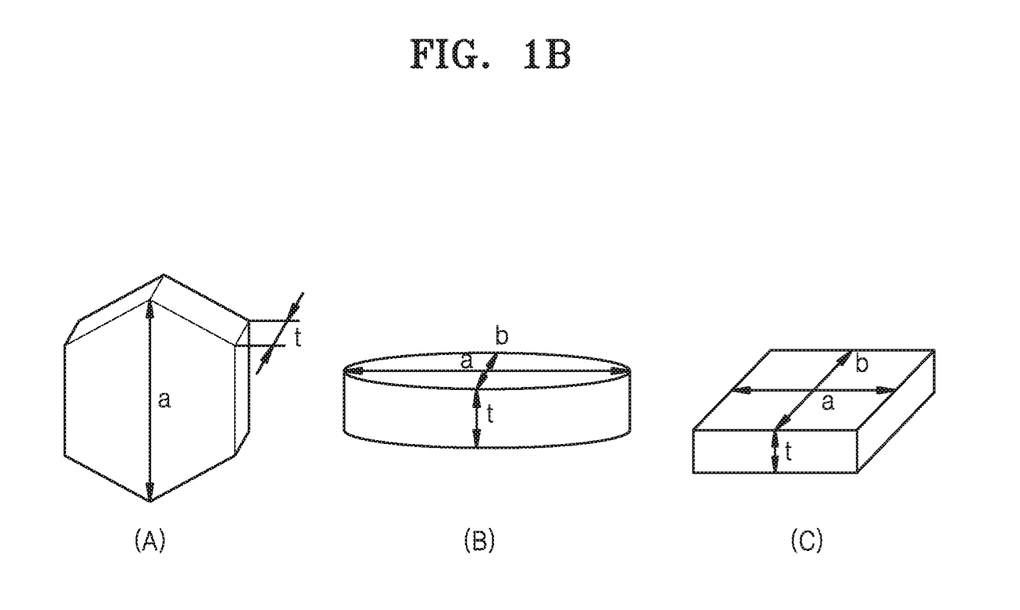
FIG. 1B is a schematic diagram illustrating shapes of plate particles of the nickel-based active material precursor.
Figure 1C:
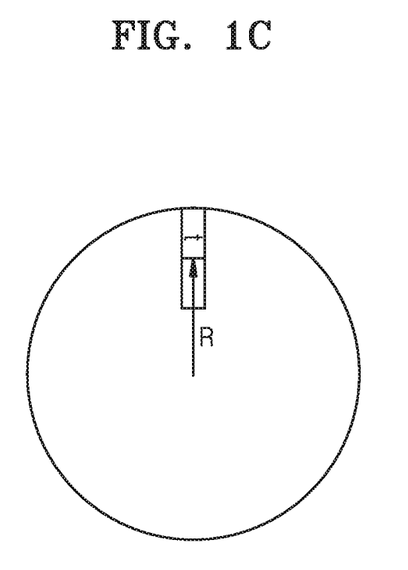
FIG. 1C is a diagram for describing the definition of a radial arrangement in a secondary particle of a nickel-based active material according to an embodiment.

Hereinafter, a nickel-based active material precursor according to an embodiment of the present disclosure will be described with reference to FIGS. 1A to 1C. FIG. 1A is a schematic diagram illustrating a structure of a nickel-based active material precursor according to an embodiment, FIG. 1B is a schematic diagram illustrating shapes of plate particles of the nickel-based active material precursor, and FIG. 1C is a diagram for describing the definition of a radial arrangement in a secondary particle of a nickel-based active material according to an embodiment.

Referring to FIG. 1A, a nickel-based active material precursor 10 according to an embodiment includes a porous core 11 and a shell 12 formed on the porous core 11. Here, the nickel-based active material precursor 10 may have a particle size of about 9 μm to about 14 μm and a volume of about 5% by volume to about 20% by volume based on the total volume of the porous core 11. The shell 12 may have a greater density than that of the porous core 11.

The nickel-based active material precursor having a porous structure according to an embodiment may prevent a lithium diffusion length from increasing with the increase of the particle size, and may also give a density gradient by controlling density of the porous core 11 to be smaller than that of the shell 12. In this regard, a cathode active material produced from the nickel-based active material precursor has a porous layer in the center of particles that have a small volume fraction but increase a lithium diffusion distance. By controlling the size of the particles that have a large volume but has a little effect on a lithium diffusion distance, the cathode may have a structure advantageous in facilitating diffusion of lithium into the particles during charging and discharging and adsorbing the stress generated therein. In addition, because open pores are well developed on a surface resulting from the radial arrangement structure of the nickel-based active material precursor, an electrolyte may easily permeate therethrough so as to facilitate diffusion of lithium. In addition, because the porous core of the nickel-based active material precursor has a radial arrangement structure, stress may be reduced during charging and discharging.

The porous core 11 refers to a region of about 30% by length to about 70% by length, for example, 60% by length of the total distance from the center of the nickel-based compound to the surface of the nickel-based compound from the center of the nickel-based compound, or refers to a remaining region a except for a region within 2 μm in thickness from the outermost periphery.

The porous core 11 may have an irregular porous pore. The term "irregular porous structure" as used herein refers to a structure having pores of which a size and a shape are not regular and are non-uniform.

The porous core 11 may include plate particles which may non-uniformly be arranged. Referring to FIG. 1B, a plate particle may have a polygonal nanoplate shape such as a hexagonal plate shape (A), a nanodisc shape (B), and a rectangular parallpiped shape (C). In FIG. 1B, a thickness t of the plate particle is smaller than lengths a and b in the plane direction. The length a in the plane direction may be the same or greater than the length b in the plane direction. A direction in which the thickness t of the plate particle is defined is referred to as a thickness direction, and a direction including the lengths a and b is referred to as a plane direction. The plate particles may be arranged such that a thickness plane of the plate particle may be aligned and aligned to the surface of the secondary particles. Here, a crystal plane to which lithium can enter and exit is exposed to the surface of the secondary particles, and the crystal plane which is a plane perpendicular to the crystal plane (001) of the nickel-based active material precursor refers to a thickness plane of the plate particle. The term "plate particle" as used herein refers to a particle having a thickness smaller than a length of a longer axis (a plane direction) of the plate particle. The length of the longer axis refers to a maximum length of the widest plane of the plate particle. That is, the plate particle refers to a structure in which a thickness tin one axial direction (i.e., a thickness direction) is smaller than a length a of the longer axis in the other direction (i.e., a plane direction).

The shell 12 refers to an area b of 30% by length to 50% by length, for example, 40% by length, from the outermost surface based on a total distance from the center to the surface of the nickel-based active material precursor or an area within 2 μm from the outermost surface of the nickel-based active material precursor.

The shell 12 may include plate particles like the porous core 11 as described above, and the plate particles may have a structure arranged in a specific direction. For example, the shell 12 may have a radial arrangement structure. As such, when the shell 12 of the nickel-based active material precursor has a radial arrangement structure in the same manner as in the core, the stress during charging and discharging may be further reduced. The term "radial(ly)" as used herein means that a direction of the thickness t of a plate (i.e., a plane (001) direction) may be arranged in a direction perpendicular to or within ±5° of a direction perpendicular to a direction R toward a center of the secondary particle as shown in FIG. 10.

In one embodiment, a volume ratio of the porous core and the shell may be, for example, in a range of about 1:4 to about 1:20, for example, about 1:4 to about 1:10.

The core of the nickel-based active material precursor according to an embodiment may have a porosity in a range of about 15% to about 30%, and may have a pore size of about 150 nm to about 1 μm. In addition, the shell of the nickel-based active material precursor according to an embodiment may have a porosity in a range of about 2% to about 5%, and may have a pore size in a range of about 50 nm to about 148 nm. Throughout the specification, the term "porosity" refers to a ratio of an area occupied by pores to a total area.

Throughout the specification, the term "size" refers to, when a subject is a particle, a diameter or an average diameter of the subject, or when a subject is not a particle, the term refers to a length of a longer axis of the subject.

The nickel-based active material precursor 10 according to an embodiment may have a specific surface area of 4 m²/g to 8 m²/g. Due to such a large specific surface area of the nickel-based active material precursor 10, diffusion of lithium may be performed more easily.

The nickel-based active material precursor 10 according to an embodiment may have a maximum diffusion distance of lithium of 5 μm or less, for example, 2.3 μm to 5 μm Due to such a short maximum diffusion distance of lithium, when a cathode including a nickel-based active material formed from the nickel-based active material precursor is used for a lithium secondary battery, a lithium secondary battery with increased charging and discharging efficiency and increased capacity may be manufactured.

A volume of the nickel-based active material precursor including the porous core 11 and the shell 12 is proportional to the square root of 3 of a radius of the nickel-based active material precursor (where volume of sphere=$4/3*\pi r^3$). That is, the fraction contributing the total volume becomes smaller toward the center of the sphere. When the nickel-based active material precursor is used, the diffusion distance of lithium during charging and discharging is equal to the radius of porous core 11 and the shell 12.

The core having a small fraction contributing to the volume of the nickel-based active material precursor may be emptied after the heat treatment. As a result, the diffusion distance may be prevented from increasing as the particle size increases. The decrease in the overall volume due to the vacancies of the core of the nickel-based active material precursor may be compensated by using a large-particle-sized (large average particle diameter) nickel-based active material precursor. In this regard, the increase in pore spaces of the nickel-based active material precursor may be solved by using a small-particle-sized nickel-based active material precursor in combination.

In one embodiment, the nickel-based active material precursor may further include a nickel-based active material precursor having a size of 9 μm to 14 μm (large-particle-sized nickel-based active material precursor) and a nickel-based active material precursor having a size of 0.1 μm to 8 μm (small-particle-sized nickel-based active material precursor).

The size of the small-particle-sized nickel-based active material precursor may be, for example, 2.5 μm to 5.0 μm. A weight ratio of the large-particle-sized nickel-based active material precursor and the small-particle-sized nickel-based active material precursor in a mixture may be 9:1 to 1:9.

Hereinafter, a method of producing a nickel-based active material precursor according to an embodiment will be described.

The method of producing a nickel-based active material precursor according to an embodiment includes: a first step of forming a porous core by reacting a mixture of a complexing agent, a pH regulator, and a metal raw material for forming the nickel-based active material precursor; and a second step of forming a shell on the porous core obtained in the first step, the shell having a radial arrangement structure with higher density than that of the porous core. The nickel-based active material precursor produced according to an embodiment may be prepared to have excellent structural stability by appropriately maintaining pores formed by the crystal planes (001) while minimizing exposure of the crystal planes (001). In addition, the shell of the nickel-based active material precursor may have a radial arrangement structure, and the length of lithium diffusion may be efficiently controlled by this structure.

In the first step and the second step, a reaction temperature may be adjusted within a range of 40° C. to 60° C., a stirring power may be adjusted within a range of 0.1 kW/m³ to 10.0 kW/m³, and a pH may be adjusted within a range of 10 to 12. In addition, in the first step and the second step, a concentration of ammonia water which is used as the complexing agent may be in a range of 0.1 M to 1 M.

In the first step, a porous core may be formed. In detail, the complexing agent and the metal raw material for forming the nickel-based active material precursor may be supplied and reacted to form a core.

In the nickel-based active material precursor according to an embodiment, the porous core structure may be influenced by the supplying speed of the metal raw material, the concentration of the complexing agent, and the pH of the reaction mixture. The pH regulator serves to form a precipitate from the reaction mixture by adjusting the pH of the reaction mixture. Examples of the pH regulator are ammonium hydroxide, sodium hydroxide (NaOH), sodium carbonate ($Na_2CO_3$), and sodium oxalate ($Na_2C_2O_4$). As the pH regulator, for example, sodium hydroxide (NaOH) is used. The complexing agent adjusts a reaction rate of forming a precipitate in coprecipitation reaction, and may be ammonium hydroxide ($NH_4OH$) (ammonia water), citric acid, and the like. The complexing agent may be used in any amount commonly used in the art. As the complexing agent, for example, ammonia water is used.

In the first step, the metal raw material may be supplied at a speed of 5 L/hr to 15 L/hr, for example, 7 L/hr to 10 L/hr, and the complexing agent may be supplied at a speed of 0.1 L/hr to 5 L/hr, for example, 0.2 L/hr to 3.5 L/hr, and for example, 0.5 L/hr to 2 L/hr. In the first step, the stirring power may be 0.1 kW/m² to 10 kW/m², for example, 2.0 kW/m² to 6.0 kW/m², and the concentration of the complexing agent may be 0.1 M to 1 M, for example, 0.3 M to 0.6 M. In the first step, the reaction time may be 15 hours to 20 hours, for example, 15 hours to 17 hours.

Particles of the product obtained in the first step may have an average particle diameter (D50) may be 5 μm to 10 μm, for example, 8.0 μm to 9.5 μm, and for example, 8.5 μm to 9.5 μm.

The second step may include forming a shell on the core obtained in the first step, the shell having a greater density than that of the core. In detail, a metal raw material and a complexing agent are added to the reaction product obtained in the first step, and a pH of a reaction mixture was adjusted and then the resultant reaction mixture was reacted, so as to form a shell having a radial arrangement structure with a higher density than that of the porous core is formed on the porous core obtained in the first step.

In the second step, the metal raw material for forming the nickel-based active material precursor and the complexing agent may be supplied at a speed reduced as compared with the first step. In one embodiment, the rate at which the metal raw material and the complexing agent are supplied may be reduced to 10% to 40% based on a rate at which the metal raw material and the complexing agent are supplied in the first step. As such, through the changes of the rates at which the metal raw material and the complexing agent are supplied in the first step and the second step, respectively, a nickel-based active material precursor having a structure and a size according to an embodiment may be obtained. In addition, in the second step, the density of the nickel-based active material precursor may be increased by slowing down a speed at which a surface layer is formed, so as to overcome the reduction of the density of the nickel-based active material precursor due to pores in the center.

In the second step, the metal raw material may be supplied at a speed of 3 L/hr to 10 L/hr, for example, 5 L/hr to 8 L/hr, and the complexing agent may be supplied at a speed of 0.1 L/hr to 5 L/hr, for example, 0.2 L/hr to 3.5 L/hr, and for example, 0.5 L/hr to 1 L/hr. In addition, in the second step, the stirring power may be 2.5 kW/m² to 4.5 kW/m², the concentration of the complexing agent may be 0.1 M to 1 M, for example, 0.3 M to 0.6 M, and the reaction time may be 5 hours to 7 hours. In the first step and the second step, the concentration of the complexing agent is maintained, but the rate at which the metal raw material is supplied decreases.

In the preparation process, as the metal raw material, a metal precursor is used in consideration of the composition of the nickel-based active material precursor. The metal raw material may be metal carbonate, metal sulfate, metal nitrate, metal chloride, and the like.

To prepare the compound represented by Formula 1, a manganese precursor, a nickel precursor, and a cobalt precursor may be used as the metal raw material.

The nickel-based active material precursor according to an embodiment may be a compound represented by Formula 1:

$$Ni_{1-x-y-z}Co_xMn_yM_z(OH)_2. \quad [\text{Formula 1}]$$

In Formula 1, M may be an element selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and $x \leq (1-x-y-z)$, $y \leq (1-x-y-z)$, $z \leq (1-x-y-z)$, $0<x<1$, $0 \leq y<1$, and $0 \leq z<1$ may be satisfied.

In Formula 1, $0<x \leq \frac{1}{3}$, $0 \leq y \leq 0.5$, $0 \leq z \leq 0.05$, and $\frac{1}{3} \leq (1-x-y-z) \leq 1.95$ may be satisfied.

In Formula 1, metal hydroxide may be, for example, $Ni_{0.6}Co_{0.2}Mn_{0.2}(OH)_2$, $Ni_{0.5}Co_{0.2}Mn_{0.3}(OH)_2$, $Ni_{1/3}CO_{1/3}Mn_{1/3}(OH)_2$, or $Ni_{0.8}Co_{0.1}Mn_{0.1}(OH)_2$.

In Formula 1, $0<x \leq \frac{1}{3}$, and for example, $0.1 \leq x \leq \frac{1}{3}$, and y may satisfy $0 \leq y \leq 0.5$, for example, $0.05 \leq y \leq 1.3$, $0 \leq z \leq 0.05$, or $\frac{1}{3} \leq (1-x-y-z) \leq 1.95$. For example, in Formula 1, x, y, and z may satisfy $\frac{1}{3}(1-x-y-z) \leq 0.95$. In one or more embodiments, in Formula 1, z may satisfy $0 \leq z \leq 0.05$, x may satisfy $0<x \leq \frac{1}{3}$, and y may satisfy $0 \leq y \leq \frac{1}{3}$. In one or more embodiments, z in Formula 1 may be 0. In one or more embodiments, when z in Formula 1 may satisfy $0<z \leq 1.05$, M may be Al.

Hereinafter, a method of producing a nickel-based active material by using the nickel-based active material precursor according to an embodiment will be described.

A lithium precursor and the nickel-based active material precursor according to an embodiment are mixed in a certain molar ratio and then subjected to a low-temperature heat treatment process at 600° C. to 800° C. to prepare a nickel-based active material.

The lithium precursor may be, for example lithium hydroxide, lithium fluoride, lithium carbonate, or any mixture thereof. A mixing ratio of the lithium precursor and the nickel-based active material precursor is adjusted stoichiometrically to prepare a desired nickel-based active material.

The mixing may be performed by dry mixing or by using a mixer.

The low-temperature heat treatment is performed in an oxidizing gas atmosphere. The oxidizing gas atmosphere is performed using an oxidizing gas such as oxygen or air, and the oxidizing gas may include, for example, 10% by volume to 20% by volume of oxygen or air and 80% by volume to 90% by volume of an inert gas.

The heat treatment may be performed at a temperature where reactions of the lithium precursor and the nickel-based active material precursor proceed and a densification temperature or less than the densification temperature. In this regard, the densification temperature refers to a temperature at which crystallization is sufficiently performed to realize a charge capacity obtained by an active material.

The heat treatment is performed, for example, at 600° C. to 800° C., particularly, at 700° C. to 800° C. A heat treatment time may vary according to the temperature of the low-temperature heat treatment, and the like, but may be, for example, in a range of 3 to 10 hours.

When the heat treatment is performed under the above-described conditions, primary particles of a nickel-based active material including a shell having a radial arrangement structure and a core having a irregular porous structure may be prepared. An average particle diameter of the primary particles of the nickel-based active material may be in a range of 100 nm to 250 nm in a shorter axis direction. Due to such an average particle diameter, stress caused by volume changes during charging and discharging may be suppressed.

Secondary particles of the nickel-based active material may be subjected to a second heat treatment (high-temperature heat treatment, high-temperature sintering) in an oxidizing gas atmosphere.

The high-temperature heat treatment is performed, for example, at 700° C. to 900° C. A high-temperature heat treatment time may vary according to the temperature of the high-temperature heat treatment, and the like, but may be, for example, in a range of 3 to 10 hours.

The nickel-based active material obtained according to the process described above may have, in the same manner as in the nickel-based active material precursor, a structure including a porous core and a shell. Here, the nickel-based active material may include a plate particle, and a longer axis of the plate particle is radially arranged.

In the nickel-based active material according to an embodiment, when primary plate particles are radially arranged, the pores exposed on surfaces therebetween may be toward a central direction, thereby facilitating diffusion of lithium from the surface. Uniform shrinking and expanding are possible during intercalation and deintercalation of lithium by the radially arranged primary particles, pores located in the (001) direction, in which particles expand during deintercalation of lithium, buffer the expansion, the probability of occurrence of cracks decreases during shrinkage and expansion due to small sizes of primary plate particles, and the probability of occurrence of cracks between primary particles is further reduced during charging and discharging due to a change in volume changes by pores of the core. Thus, lifespan characteristics are improved and an increase of resistance is suppressed.

In the nickel-based active material according to an embodiment, the core may have a pore size of 150 nm to 550 μm, and the shell may have a pores size of less than 150 nm. The core of the nickel-based active material may have closed pores, and the shell may have closed pores and/or open pores. Closed pores are difficult to contain an electrolyte, whereas open pores may contain the electrolyte in the pores of the core. Throughout the specification, a closed pore refers to an independent pore having a closed wall structure without being connected to another pore and an open pore refers to a continuous pore having a wall structure, at least one portion of which is open, and connected to the shell of the particle.

The secondary particle has open pores having a size of less than 150 nm toward at a central area of the core. In addition, an average particle diameter of the secondary particles of the nickel-based active material is in a range of 2 μm to 18 μm, for example, 3 μm to 12 μm.

In the high-temperature heat treatment of the primary particles of the nickel-based active material, a hetero-element compound including at least one selected from zirconium (Zr), titanium (Ti), aluminum (Al), magnesium (Mg), tungsten (W), phosphorus (P), and boron (B) may further be added thereto.

Examples of the hetero-element compound including at least one selected from zirconium (Zr), titanium (Ti), aluminum (Al), magnesium (Mg), tungsten (W), phosphorus (P), and boron (B) may include titanium oxide, zirconium oxide, aluminum oxide, and the like. The hetero-element compound may include both of lithium (Li) and a hetero-element. The hetero-element compound may be, for example, i) an oxide of at least one selected from zirconium (Zr), titanium (Ti), aluminum (Al), magnesium (Mg), tungsten (W), phosphorus (P), and boron (B) or ii) an oxide including lithium and at least one selected from zirconium (Zr), titanium (Ti), aluminum (Al), magnesium (Mg), tungsten (W), phosphorus (P), and boron (B).

The hetero-element compound may be, for example, $ZrO_2$, $Al_2O_3$, $LiAlO_2$, $Li_2TiO_3$, $Li_2ZrO_3$, $LiBO_3$, and $Li_3PO_4$.

An amount of the compound including the above-described hetero-element may be in a range of 0.0005 to 0.01 parts by weight based on 100 parts by weight of the secondary particles of the nickel-based active material. The existence and distribution of the oxide including the hetero-element may be identified by Electron Probe Micro-Analysis (EPMA).

When the active material is discharged, a diffusion rate of lithium decreases at the end of discharging and large-particle-sized secondary particles of the nickel-based active material increase resistance to permeation of lithium into the cores of the secondary particles of the nickel-based active material, and thus discharge capacity decreases in comparison with charge capacity, thereby deteriorating charge/discharge efficiency. However, in the secondary particle of the nickel-based active material according to an example embodiment, the porous core structure may reduce a diffusion distance to the core and the shell radially aligned toward the surface may facilitate intercalation of lithium into the surface. In addition, due to small-particle-sized primary particles of the nickel-based active material, lithium transfer paths may be easily secured among crystal grains. Also, because the primary particles have small sizes and pores between the primary particles buffer volume changes caused during charging and discharging, stress caused by volumes changes during charging and discharged may be minimized.

Regarding the volume ratio and area ratio of the core and the shell in the nickel-based cathode active material which is cut in a cross-section according to an embodiment, when an area within about 60% from the center of the nickel-based cathode active material is defined as a core, the core may be occupied by 20% by volume to 35% by volume, for example, about 22%, based on the total volume of the nickel-based active material.

C-planes of the primary particles of the nickel-based active material according to an embodiment are aligned in the radial direction.

In the nickel-based active material, the amount of Ni is in a range of ⅓ to 0.95 mol %, which is greater than that of each of Mn and Co, based on the total amount of transition metals (Ni, Co, and Mn).

In the nickel-based active material, the amount of Ni is greater than each of the other transition metals based on 1 mole of the transition metals. By using the nickel-based active material having such a high Ni content, the degree of lithium diffusion increases, conductivity increases, and higher capacity may be obtained at the same voltage in a lithium secondary battery including a cathode containing the nickel-based active material. However, lifespan characteristics may deteriorate due to occurrence of cracks.

The nickel-based active material is, for example, $LiNi_{0.6}Co_{0.2}Mn_{0.2}O_2$, $LiNi_{0.5}CO_{0.2}Mn_{0.3}O_2$, $LiNi_{1/3}CO_{1/3}Mn_{1/3}O_2$, $LiNi_{0.8}Co_{0.1}Mn_{0.1}O_2$, or $LiNi_{0.85}CO_{0.1}Al_{0.05}O_2$.

The overall porosity of the nickel-based active material is in a range of 1% to 8%, for example, 1.5% to 7.3%.

A porosity of the outer portion of the nickel-based active material is less than that of the inner portion. Pores exposed on the surface arranged toward the center, and sizes of the pores are less than 150 nm, for example, in a range of 10 nm to 100 nm when viewed from the surface. The porosity of the inner portion is in a range of 2% to 20%, and a closed porosity of the outer portion is in a range of 0.1% to 2%. The term "closed porosity" refers to a fraction of closed pores (pores into which an electrolytic solution cannot permeate) with respect to a total volume of pores.

In the nickel-based active material according to an embodiment, the porosity of the inner portion is in a range of 3.3% to 16.5% and the porosity of the outer portion is in a range of 0.3% to 0.7%.

According to another embodiment, a lithium secondary battery including a cathode containing the nickel-based active material, an anode, and an electrolyte interposed therebetween is provided. A method of producing the lithium secondary battery will be described later.

The electrolyte of the lithium secondary battery according to an embodiment may be a lithium-containing non-aqueous electrolyte, and the electrolyte of the lithium secondary battery according to an embodiment may include a separator.

The cathode and the anode are prepared by coating a cathode active material layer-forming composition and an anode active material layer-forming composition on current collectors and drying the coated compositions, respectively.

The cathode active material layer-forming composition is prepared by mixing a cathode active material, a conductive agent, a binder, and a solvent, and the cathode active material according to an example embodiment is used as the cathode active material.

The binder, as a component assisting binding of the active material to the conductive agent and to the current collector, may be added thereto in an amount of 1 to 50 parts by weight based on 100 parts by weight of a total weight of the cathode active material. Examples of the binder may include, but are not limited to, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluoride rubber, and various copolymers. An amount of the binder may be in a range of 2 to 5 parts by weight based on 100 parts by weight of the total weight of the cathode active material. When the amount of the binder is within the range above, a high binding force of the active material to the current collector is obtained.

The conductive agent may be any material that does not cause any chemical change in a battery and has conductivity, without limitation. For example, the conductive agent may be: graphite such as natural graphite and artificial graphite; a carbonaceous material such as carbon black, acetylene black, ketjen black, channel black, furnace black, lamp black, and thermal black; conductive fiber such as carbon fiber and metal fiber; carbon fluoride; metal powder such as aluminum powder and nickel powder; conductive whisker such as zinc oxide and potassium titanate; conductive metal oxide such as titanium oxide; and conductive materials such as polyphenylene derivatives.

An amount of the conductive agent may be in a range of 2 to 5 parts by weight based on 100 parts by weight of the total weight of the cathode active material. When the amount of the conductive agent is within the range above, a finally obtained electrode has excellent conductivity.

Examples of the solvent may include, but are not limited to, N-methylpyrrolidone in any amount commonly used in the art.

The cathode current collector may have a thickness of 3 to 500 μm and be any material having high conductivity and not causing any chemical change in a battery without limitation. Examples of the cathode current collector may include stainless steel, aluminum, nickel, titanium, heat-treated carbon, or aluminum or stainless-steel surface-treated with carbon, nickel, titanium, silver, or the like. The current collector may have a surface on which irregularities are formed to enhance adhesive force of the cathode active material and may be used in any of various forms including films, sheets, foils, nets, porous structures, foams, and non-woven fabrics.

Separately, an anode active material, a binder, a conductive agent, and a solvent are mixed to prepare an anode active material layer-forming composition.

Examples of the anode active material include, but are not limited to, a carbonaceous material such as graphite and carbon, lithium metal, an alloy thereof, and a silicon oxide-based material. According to an example embodiment of the present disclosure, silicon oxide is used.

The binder is added thereto in an amount of 1 to 50 parts by weight based on 100 parts by weight of a total weight of the anode active material. The binder may be the same type as that of the cathode, without limitation.

The conductive agent is used in an amount of 1 to 5 parts by weight based on 100 parts by weight of the total weight of the anode active material. When the amount of the conductive agent is within this range, a finally obtained electrode has excellent conductivity.

The solvent is used in an amount of 1 to 10 parts by weight based on 100 parts by weight of the total weight of the anode active material. When the amount of the solvent is within this range, a process of forming an anode active material layer is easily performed.

The conductive agent and the solvent may be the same types as those used in preparing the cathode.

The anode current collector is generally formed to have a thickness of 3 to 500 μm. The anode current collector may be any conductive material not causing any chemical change in a battery without limitation. Examples of the anode current collector may include, but are not limited to, copper, stainless steel, aluminum, nickel, titanium, heat-treated carbon, copper or stainless-steel surface-treated with carbon, nickel, titanium, silver, or the like, or an aluminum-cadmium alloy. In addition, like the cathode current collector, the anode current collector may have a surface on which irregularities are formed to enhance adhesive force of the anode active material and may be used in any of various forms including films, sheets, foils, nets, porous structures, foams, and non-woven fabrics.

The separator is interposed between the cathode and the anode each prepared according to the above-described process.

The separator may have a pore diameter of 0.01 μm to 10 μm and a thickness of 5 μm to 300 μm. Particularly, examples of the separator include: an olefin-based polymer such as polypropylene and polyethylene; or a sheet or non-woven fabric formed of glass fibers. When a solid electrolyte such as a polymer is used as the electrolyte, the solid electrolyte may also serve as a separator.

A lithium salt-containing non-aqueous electrolyte is formed of a non-aqueous electrolytic solution and lithium. A non-aqueous electrolyte may be a non-aqueous electrolytic solution, an organic solid electrolyte, an inorganic electrolyte, and the like.

Examples of the non-aqueous electrolytic solution may include, but are not limited to, any aprotic organic solvent such as N-methyl pyrrolidinone, propylene carbonate, ethylene carbonate, butylene carbonate, dimethyl carbonate, diethyl carbonate, gamma-butyro lactone, 1,2-dimethoxy ethane, 2-methyl tetrahydrofuran, dimethylsulfoxide, 1,3-dioxolane, N,N-formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include, but are not limited to, polyethylene derivatives, polyethylene oxide derivatives, polypropylene oxide derivatives, polyvinyl alcohol, and polyvinylidene fluoride.

Examples of the inorganic solid electrolyte include, but are not limited to, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material easily dissolved in the non-aqueous electrolyte, for example, but is not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic lithium carboxylate, lithium tetraphenyl borate.

Figure 2:
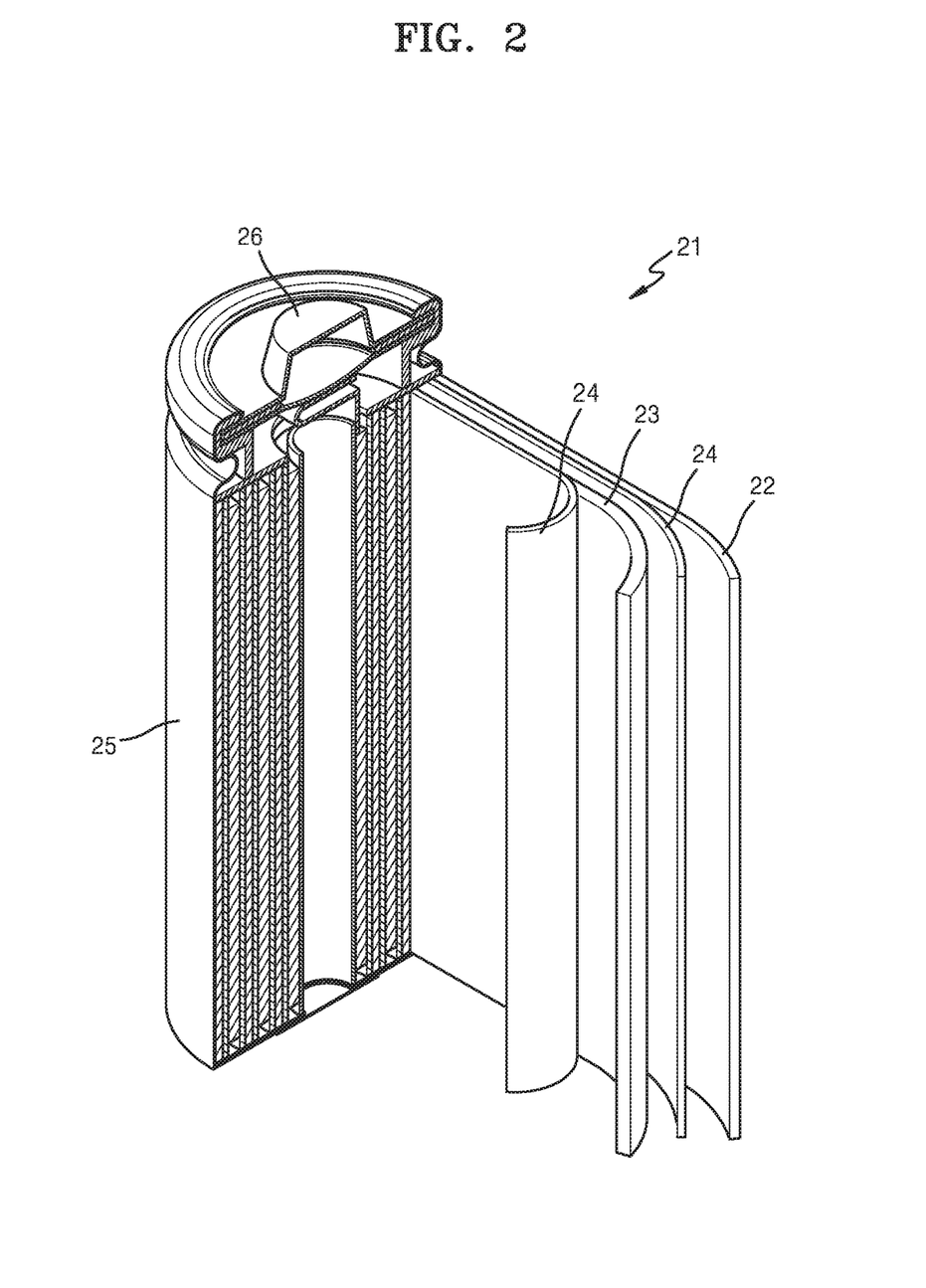
FIG. 2 is a schematic diagram illustrating a structure of a lithium secondary battery according to an embodiment.

FIG. 2 is a cross-sectional view schematically illustrating a representative structure of a lithium secondary battery according to an embodiment.

Referring to FIG. 2, a lithium secondary battery 21 includes a cathode 23, an anode 22, and a separator 24. The cathode 23, the anode 22, and the separator 24 are wound or folded, and then accommodated in a battery case 25. Subsequently, an organic electrolyte is injected into the battery case 25, and the battery case 25 is sealed with a cap assembly 26, thereby completing the manufacture of the lithium secondary battery 21. The battery case 25 may have a cylindrical, rectangular, or thin-film shape. For example, the lithium secondary battery 21 may be a large-particle-sized thin-film battery. The lithium secondary battery may be a lithium ion battery. The separator is interposed between the cathode and the anode to form a battery assembly. After the battery assembly is stacked in a bi-cell structure and impregnated with the organic electrolyte, the obtained resultant is accommodated in a pouch, thereby completing the manufacture of a lithium ion polymer battery. In addition, a plurality of battery assemblies may be stacked to form a battery pack, which may be used in any device that requires high capacity and high output. For example, the battery pack may be used in notebook computers, smart phones, and electric vehicles.

Also, the lithium secondary battery may be used in electric vehicles (EVs) due to excellent storage stability at high temperature, lifespan characteristics, and high-rate characteristics. For example, the lithium secondary battery may be used in hybrid vehicles such as plug-in hybrid electric vehicles (PHEVs).

Hereinafter, the present disclosure will be described in more detail with reference to the following examples and comparative examples. However, the following examples and comparative examples are merely presented to exemplify the present disclosure, and the scope of the present disclosure is not limited thereto.

Preparation Example 1: Manufacture of Nickel-Based Active Material Precursor

A nickel-based active material precursor ($Ni_{0.6}Co_{0.2}Mn_{0.2}$ $(OH)_2$) was synthesized according to a co-precipitation method described below. As a metal raw material forming the nickel-based active material precursor in the following manufacturing process, nickel sulfate (NiSO$_4$.6H$_2$O), cobalt sulfate (CoSO$_4$.7H$_2$O), and manganese sulfate (MnSO$_4$.H$_2$O) were used.

First, ammonia water having a concentration of 0.4 mol/L was added to a reactor. Reaction was initiated at the stirring power of 3.5 kW/m$^3$ at a reaction temperature of 40° C. while a metal raw material and ammonia water were added at respective speeds of 9 L/hr and 1 L/hr.

Next, NaOH was added to the reactor to maintain the pH. Here, the reactor had pH of 11.0 to 12.0. Within this pH range, the reaction was continued for 16 hours. In the first step, forming of a porous core of the nickel-based active material precursor was performed.

In the second step, the reaction was carried out in the same manner as in the first step, except that a metal raw material was added to the reaction product obtained in the first step at a speed of 5 L/hr, and ammonia water was added thereto at a speed of 0.5 L/hr.

The reaction in the second step was performed for 6 hours, so as to form a shell on the porous core, the shell having a radial arrangement structure with a higher density than that of the porous core. Here, the pH in the reactor was maintained in the same manner as in the first step. In the second step, the density of the nickel-based active material precursor was increased by slowly controlling a speed at which a surface layer of the shell was formed, so as to overcome the density reduction caused by pores of the porous core.

Afterwards, the reaction product obtained in the above processes was washed, and a postprocess was carried out by washing the reaction resultant and drying the washed resultant in a hot-air dryer at about 150° C. for 24 hours, thereby manufacturing a nickel-based active material precursor, i.e., metal hydroxide (Ni$_{0.6}$Co$_{0.2}$Mn$_{0.2}$(OH)$_2$) having a size of 9 μm.

Preparation Example 2: Manufacture of Nickel-Based Active Material Precursor

A nickel-based active material precursor, i.e., metal hydroxide (Ni$_{0.6}$Co$_{0.2}$Mn$_{0.2}$(OH)$_2$) having a size of 14 μm, was manufactured in the same manner as in Preparation Example 1, except that the stirring power was reduced to 2.0 kW/m$^3$ to synthesize a precursor having a size of 14 μm.

Preparation Example 3: Manufacture of Nickel-Based Active Material Precursor

A nickel-based active material precursor, i.e., metal hydroxide (Ni$_{0.6}$Co$_{0.2}$Mn$_{0.2}$(OH)$_2$), was manufactured in the same manner as in Preparation Example 1, except that the manufacturing process was changed to obtain metal hydroxide (Ni$_{0.6}$Co$_{0.2}$Mn$_{0.2}$(OH)$_2$), which is a nickel-based active material precursor, having a porosity of the core of about 15% and a porosity of the shell of 3%.

Preparation Example 4: Manufacture of Nickel-Based Active Material Precursor

A nickel-based active material precursor, i.e., metal hydroxide (Ni$_{0.6}$Co$_{0.2}$Mn$_{0.2}$(OH)$_2$), was manufactured in the same manner as in Preparation Example 1, except that the amount of ammonia water, the pH, and the stirring power for the metal raw material were changed to obtained metal hydroxide (Ni$_{0.6}$Co$_{0.2}$Mn$_{0.2}$(OH)$_2$) which is a nickel-based active material precursor having a size of Table 1 below:

TABLE 1

| Diameter of core (μm) | Diameter of shell (μm) | Thickness of shell (μm) | Proportion of shell (% by volume) | Proportion of core (% by volume) |
|---|---|---|---|---|
| 4.5 | 12 | 3.8 | 94.7 | 5.3 |
| 5.0 | 12 | 3.5 | 92.8 | 7.2 |
| 5.7 | 12 | 3.2 | 89.3 | 10.7 |
| 6.0 | 12 | 3.0 | 87.5 | 12.5 |
| 6.3 | 12 | 2.9 | 85.5 | 14.5 |
| 7.0 | 12 | 2.5 | 80.2 | 19.8 |

Example 1: Manufacture of Nickel-Based Active Material

The metal hydroxide (Ni$_{0.6}$Co$_{0.2}$Mn$_{0.2}$(OH)$_2$) manufactured according to Preparation Example 1 and lithium hydroxide (LiOH) were dry-mixed at a molar ratio of 1:1, and the mixture was heat-treated in an air atmosphere at about 800° C. for 6 hours, thereby obtaining primary particles of a nickel-based active material (LiNi$_{0.6}$Co$_{0.2}$Mn$_{0.2}$O$_2$). The primary particles thus obtained had a core having a porous structure and a shell having a radial arrangement structure. Through this process, secondary particles of the nickel-based active material (LiNi$_{0.6}$Co$_{0.2}$Mn$_{0.2}$O$_2$) were obtained.

Examples 2 and 3: Manufacture of Nickel-Based Active Materials

Secondary particles of the nickel-based active material (LiNi$_{0.6}$Co$_{0.2}$Mn$_{0.2}$O$_2$) were obtained in the same manner as in Example 1, except that the nickel-based active material precursors respectively of Preparation Examples 2 and 3 were respectively used instead of the nickel-based active material precursor of Preparation Example 1.

Comparative Preparation Example 1: Manufacture of Nickel-Based Active Material Precursor A nickel-based active material precursor (Ni$_{0.6}$Co$_{0.2}$Mn$_{0.2}$(OH)$_2$) were obtained in the same manner as in Preparation Example 1, except that the metal raw material and the ammonia water in the first step were supplied at respective speeds of 6.5 L/hr and 0.8 L/hr, and that the metal raw material and the ammonia water in the second step were supplied at respective speeds of 8.5 L/hr and 1.0 L/hr.

The speeds at which the metal raw material and the ammonia water were supplied in the second step were increased in comparison with the speeds of the metal raw material and the ammonia water were supplied in the first step.

When performed according to Comparative Preparation Example 1, it is difficult to obtain a nickel-based active material precursor having a size and a structure according to an embodiment.

Comparative Preparation Example 2: Manufacture of Nickel-Based Active Material Precursor A nickel-based active material precursor, metal hydroxide (Ni$_{0.6}$Co$_{0.2}$Mn$_{0.2}$(OH)$_2$), was manufactured in the same manner as in Comparative Preparation Example 1, except that the conditions of a manufacturing process were controlled so as to obtain a nickel-based active material precursor, metal hydroxide ($Ni_{0.6}Co_{0.2}Mn_{0.2}(OH)_2$), having the size shown in Table 2 below:

TABLE 2

| | Diameter of core (μm) | Diameter of shell (μm) | Thickness of shell (μm) | Proportion of shell (% by volume) | Proportion of core (% by volume) |
|---|---|---|---|---|---|
| Comparative Preparation Example 2 | 2.0 | 12 | 5.0 | 99.5 | 0.5 |
| | 3.0 | 12 | 4.5 | 98.4 | 1.6 |
| | 3.5 | 12 | 4.3 | 97.5 | 2.5 |
| | 4.0 | 12 | 4.0 | 96.3 | 3.7 |

Comparative Examples 1 and 2: Manufacture of Nickel-Based Active Materials

Primary particles of the nickel-based active material ($LiNi_{0.6}Co_{0.2}Mn_{0.2}O_2$) were obtained in the same manner as in Example 1, except that the nickel-based active material precursors of Comparative Preparation Example 1 and Comparative Preparation Example 2 were respectively used instead of the nickel-based active material precursor of Preparation Example 1.

Manufacture Example 1: Coin Half-Cell

A coin half-cell was prepared according to the following method by using secondary particles of the nickel-based active material ($LiNi_{0.6}Co_{0.2}Mn_{0.2}O_2$) obtained according to Example 1 as a cathode active material.

96 g of the secondary particles of the nickel-based active material ($LiNi_{0.6}CO_{0.2}Mn_{0.2}O_2$) obtained according to Example 1, 2 g of polyvinylidene fluoride, 47 g of N-methyl pyrrolidone as a solvent, and 2 g of carbon black as a conductive agent were mixed using a mixer while removing air bubbles therefrom to prepare a uniformly dispersed cathode active material layer-forming slurry.

The slurry prepared according to the process was coated on an aluminum foil by using a doctor blade to form a thin electrode plate. The electrode plate was dried at 135° C. for 3 hours or more, followed by rolling and vacuum drying to prepare a cathode.

A 2032 type coin half-cell (coin cell) was prepared by using the cathode and a lithium metal as a counter electrode. A separator (thickness: about 16 μm) formed of a porous polyethylene (PE) film was interposed between the cathode and the lithium metal counter electrode and an electrolyte was injected thereinto, thereby preparing a 2032 type coin half-cell. Here, for used as the electrolyte, a solution containing 1.1M $LiPF_6$ dissolved in a mixed solution of ethylene carbonate (EC) and ethymethyl carbonate (EMC) mixed at a volume ratio of 3:5 was used.

Manufacture Examples 2 and 3: Preparation of Coin Half-Cells

Coin half-cells were prepared in the same manner as in Manufacture Example 1, except that the nickel-based active materials respectively prepared according to Examples 2 and 3 were used instead of the secondary particles of the nickel-based active material ($LiNi_{0.6}CO_{0.2}Mn_{0.2}O_2$) of Example 1 in the manufacture of the cathode.

Comparative Manufacture Examples 1 and 2: Preparation of Coin Half-Cells

Coin half-cells were prepared in the same manner as in Manufacture Example 1, except that the nickel-based active materials prepared according to Comparative Examples 1 and 2 were used instead of the secondary particles of the nickel-based active material ($LiNi_{0.6}CO_{0.2}Mn_{0.2}O_2$) of Example 1 in the manufacture of the cathode in Example 1.

Evaluation Example 1: Composition Analysis

The nickel-based active materials respectively manufactured according to Example 1 and Comparative Example 1 were evaluated by inductively coupled plasma (ICP) analysis, and the results are shown in Table 3 below. Accordingly, the nickel-based active materials being evaluated were both confirmed to be well controlled and synthesized by target adjustment.

TABLE 3

| | Ni | Co | Mn |
|---|---|---|---|
| Example 1 | 0.610 | 0.195 | 0.195 |
| Comparative Example 1 | 0.607 | 0.197 | 0.196 |

Evaluation Example 2: Specific Surface Area

Specific surface areas of the nickel-based active materials respectively manufactured according to Example 1 and Comparative Example 1 were measured by the BET method. Here, the specific surface area was obtained based on the internal porosity and, and the results are shown in Table 4 below:

TABLE 4

| | Example 1 | Comparative Example 1 |
|---|---|---|
| Specific surface area ($m^2/g$) | 5.65 | 2.43 |

Referring to Table 4, it was confirmed that the specific surface area of the nickel-based active material of Example 1 was larger than that of the nickel-based active material of Comparative Example 1.

Evaluation Example 3: X-Ray Diffraction (XRD) Analysis

Crystal structures of the nickel-based active material precursors respectively manufactured according to Preparation Example 1 and Comparative Preparation Example 1 were analyzed by X-ray diffraction (XRD) analysis. The XRD was performed by using an X'pert pro (PANalytical) with Cu Kα radiation (1.54056 Å), and the results are shown in Table 5 below:

TABLE 5

| Unit | Comparative Preparation Example 1 | Preparation Example 1 |
|---|---|---|
| a (Å) | 3.042 | 3.044 |
| c (Å) | 4.580 | 4.608 |
| c/a | 1.506 | 1.514 |

Referring to Table 5, it was shown that the c-axis value of the nickel-based active material precursor of Preparation Example 1 was increased compared with the case of Comparative Preparation Example 1. Accordingly, the nickel-based active material precursor of Preparation Example 1 had the c-axis value of 4.6 Å or more. When this nickel-based active material precursor was used for the synthesis of an active material, a large passage through which lithium migrates was possibly provided as compared with the case of Comparative Example 1.

Evaluation Example 4: Charging and Discharging Characteristics (Initial Characteristics)

First, each of the coin half-cells prepared according to Manufacture Examples 1 to 3 and Comparative Manufacture Example 1 was charged and discharged once with 0.1 C for formation, and then, charged and discharged once with 0.2 C to identify initial charging and discharging characteristics. While repeating the charging/discharging process 50 times at 45° C. with 1 C, cycle characteristics were examined. The charge process was set to begin in a constant current (CC) mode, be converted into a constant voltage (CV) mode, and be cut off at 4.3 V with 0.05 C, and the discharge process was set to be cut off in a CC mode at 3.0 V.

The initial charging/discharging efficiency was measured, and the results are shown in Table 6 below:

TABLE 6

|  | Initial charging/discharging efficiency (%) |
|---|---|
| Manufacture Example 1 | 95.2 |
| Manufacture Example 2 | 94.3 |
| Comparative Manufacture Example 1 | 90.5 |

Referring to Table 6, it was confirmed that the coin half-cells prepared according to Manufacture Examples 1 and 2 had improved charging/discharging efficiency with 1 C as compared with the case of Comparative Manufacture Example 1. In addition, the coin half-cell prepared according to Manufacture Example 3 showed initial charging/discharging efficiency characteristics equivalent to those of the coin half-cell of Manufacture Example 1.

Evaluation Example 5: Charging and Discharging Characteristics (Rate Capability)

The rate capability of each of the coin half-cells prepared according to Manufacture Examples 1 to 3 and Comparative Manufacture Example 1 was evaluated according to the following method.

Each of the coin half-cells prepared according to Manufacture Examples 1 to 3 and Comparative Manufacture Examples 1 and 2 was charged under the conditions of a constant current (0.2 C) and a constant voltage (4.3 V, 0.05 C cut-off), rested for 10 minutes, and discharged under the conditions of a constant current (0.2 C, ⅓ C, 0.5 C, 1 C, 2 C, or 3 C) until the voltage reached 3.0 V. That is, the rate capability characteristics of each coin half-cell were evaluated by periodically changing the discharge rate at 0.2 C, ⅓ C, 0.5 C, 1 C, 2 C, or 3 C while the number of charging and discharging cycles increases. However, each cell was discharged at a rate of 0.1 C during the $1^{st}$ to $3^{1d}$ charging and discharging cycles.

The rate capability of the coin half-cells was defined by Equation 2 below, and the representative results of the discharging with 0.2 C and 1 C are shown in Table 7 below:

Rate capability characteristics[%]=(Discharge capacity when discharging cell at predetermined constant current rate)/(Discharge capacity when discharging cell at 0.1C rate)×100      <Equation 2>

The results of the rate capability characteristics are shown in Table 7 below:

TABLE 7

|  | Rate capability (@ 0.2 C/0.1 C) | Rate capability (@ 1.0 C/0.1 C) |
|---|---|---|
| Manufacture Example 1 | 99.0 | 93.9 |
| Comparative Manufacture Example 1 | 98.2 | 90.5 |
|  | 182.1 |  |

Referring to Table 7, the coin half-cell prepared according to Manufacture Example 1 had improved rate capability as compared with the coin half-cell prepared according to Comparative Manufacture Example 1. In addition, when compared with Manufacture Example 1, the coin half-cells prepared according to Manufacture Examples 2 and 3 were equivalent thereto.

Evaluation Example 6: High-Temperature Lifespan Characteristics

The lifespan characteristics of the coin half-cells prepared according to Preparation Examples 1 to 3 and Comparative Manufacture Example 1 were evaluated according to the following method.

Each coin half-cell was charged and discharged once with 0.1 C for formation, and then, charged and discharged once with 0.2 C to identify initial charging and discharging characteristics. While repeating the charge/discharge process 50 times at 45° C. with 1 C, cycle characteristics were examined. The charge process was set to begin in a constant current (CC) mode, be converted into a constant voltage (CV) mode, and be cut off at 4.3 V with 0.05 C, and the discharge process was set to be cut off in a CC mode at 3.0 V. Changes in discharge capacity according to repeated cycles were examined, and the lifespan of the coin half cells was calculated according to Equation 3 below and the results are shown in Table 8 below:

Lifespan (%)=(Discharge capacity after $50^{th}$ cycle/Discharge capacity after $1^{st}$ cycle)×100      [Equation 3]

TABLE 8

|  | Lifespan (%) |
|---|---|
| Manufacture Example 1 | 98.9 |
| Manufacture Example 2 | 99.5 |
| Comparative Manufacture Example 1 | 98.3 |

Referring to Table 8, it was confirmed that the coin half-cells of Manufacture Examples 1 and 2 had improved lifespan characteristics as compared with the case of Comparative Manufacture Example 1. In addition, when compared with Manufacture Example 1, the coin half-cell prepared according to Manufacture Example 3 was equivalent thereto.

Evaluation Example 7: SEM Analysis

Particles of the nickel-based active material precursors manufactured according to Preparation Example 1 and Comparative Preparation Example 1 were partially fractured, and cross-sections of the fractured particles were analyzed using a scanning electron microscope (SEM). In addition, surfaces of the nickel-based active materials obtained from the nickel-based active material precursors and prepared according to Example 1 and Comparative Example 3 were analyzed using an SEM. For use as an SEM, Magellan 400L (FEI company) was used. Cross-sections of samples were pre-processed by milling using a CP2 manufactured by JEOL at 6 kV and 150 uA for 4 hours. In addition, the SEM analysis was performed under conditions of 350 V and 3.1 pA SE.

As a result of the SEM analysis, it was confirmed that the nickel-based active material precursor manufactured according to Preparation Example 1 had a crystal plane (001) aligned outward, so that the nickel-based active material had pores having a size of 100 nm to 200 nm aligned toward the center and had a structure in which the plane (001) was aligned outward. In addition, as a result of examining the cross-sectional structure of the resulting fractured product of the nickel-based active material precursor manufactured according to Preparation Example 1, it was confirmed that the primary particles had a plate structure.

In comparison, it was confirmed that the plane (001) in the nickel-based active material precursor manufactured according to Comparative Preparation Example 1 was not aligned from the center to the outside, so that, unlike the nickel-based active material precursor manufactured according to Preparation Example 1, the nickel-based active material precursor manufactured according to Comparative Preparation Example 1 was fractured in a irregular manner.

Evaluation Example 9: Maximum Diffusion Distance of Lithium

Regarding the nickel-based active material precursor manufactured according to Preparation Example 4, a thickness of the shell, a volume of the shell, a volume of the core, and a maximum diffusion distance of lithium were examined, and the results are shown in Table 9 below. Here, the maximum diffusion distance of lithium is the same as the thickness of the shell, and the diameter of the shell in Table 9 below can be interpreted to have the same meaning as the size of the nickel-based active material.

Referring to Table 9, it was confirmed that the nickel-based active material precursor manufactured according to Preparation Example 4 had a short diffusion distance of lithium as compared to the nickel-based active material precursor manufactured according to Comparative Preparation Example 2.

Evaluation Example 6: Porosity Analysis

The nickel-based active material precursors manufactured according to Preparation Examples 1 and 3 and the nickel-based active material precursor manufactured according to Comparative Preparation Example 1 were analyzed using an SEM.

For use as an SEM, Magellan 400L (FEI company) was used. Cross-sections of samples were pre-processed by milling using a CP2 manufactured by JEOL at 6 kV and 150 uA for 4 hours. In addition, the SEM analysis was performed at 350 V.

The analysis results are shown in Table 10 below.

TABLE 10

|  | Region | Porosity (%) |
| --- | --- | --- |
| Preparation Example 1 | Porous core | 29.93 |
|  | Shell | 4.52 |
| Preparation Example 3 | Porous core | 15 |
|  | Shell | 3 |
| Comparative Preparation Example 1 | Porous core | 1.56 |
|  | Shell | 3.25 |

While one or more exemplary embodiments have been described with reference to the preparation examples and examples, it will be understood by those of ordinary skill in the art that various changes in form and details may be made therein without departing from the spirit and scope as defined by the following claims.

The invention claimed is:

1. A nickel-based active material precursor for a lithium secondary battery, comprising:
a porous core; and
an exterior shell having a radially arranged structure and physically contacting the porous core with the exterior shell having a higher density than the porous core,
wherein the exterior shell is an outermost layer of the nickel-based active material precursor,

TABLE 9

|  | Diameter of core (μm) | Diameter of shell (μm) | Thickness of shell (μm) | Proportion of shell (% by volume) | Proportion of core (% by volume) | Maximum diffusion distance of lithium (μm) |
| --- | --- | --- | --- | --- | --- | --- |
| Preparation Example 4 | 4.5 | 12 | 3.8 | 94.7 | 5.3 | 3.8 |
|  | 5.0 | 12 | 3.5 | 92.8 | 7.2 | 3.5 |
|  | 5.7 | 12 | 3.2 | 89.3 | 10.7 | 3.2 |
|  | 6.0 | 12 | 3.0 | 87.5 | 12.5 | 3.0 |
|  | 6.3 | 12 | 2.9 | 85.5 | 14.5 | 2.9 |
|  | 7.0 | 12 | 2.5 | 80.2 | 19.8 | 2.5 |
| Comparative Preparation Example 2 | 2.0 | 12 | 5.0 | 99.5 | 0.5 | 5.1 |
|  | 3.0 | 12 | 4.5 | 98.4 | 1.6 | 4.5 |
|  | 3.5 | 12 | 4.3 | 97.5 | 2.5 | 4.3 |
|  | 4.0 | 12 | 4.0 | 96.3 | 3.7 | 4.0 | wherein the nickel-based active material precursor has a size of about 9 μm to about 14 μm, and the porous core has a volume of about 5% by volume to about 20% by volume based on the total volume of the nickel-based active material precursor, wherein a porosity of the porous core is in a range of about 15% to about 30%.

2. The nickel-based active material precursor of claim 1, wherein a maximum diffusion distance of lithium in the nickel-based active material precursor is 5 μm or less.

3. The nickel-based active material precursor of claim 1, wherein a porosity of the exterior shell is in a range of about 2% to about 5%.

4. The nickel-based active material precursor of claim 1, wherein the nickel-based active material precursor comprises a plate particle, and a major axis of the plate particle is radially arranged.

5. The nickel-based active material precursor of claim 1, wherein the nickel-based active material precursor is a compound represented by Formula 1:

$$Ni_{1-x-y-z}Co_xMn_yM_z(OH)_2 \quad \text{[Formula 1]}$$

wherein M in Formula 1 is an element selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and $x \leq (1-x-y-z)$, $y \leq (1-x-y-z)$, $z \leq (1-x-y-z)$, $0<x<1$, $0 \leq y<1$, and $0 \leq z<1$ are satisfied.

6. The nickel-based active material precursor of claim 5, wherein an amount of nickel in the nickel-based active material precursor is 1/3 to 0.95 mol % of the total amount of transition metals (Ni, Co, and Mn), and the amount of nickel is greater than that of Mn and the amount of nickel is greater than that of that of Co.

7. The nickel-based active material precursor of claim 1, wherein the nickel-based active material precursor is $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, or $Ni_{0.85}Co_{0.1}Al_{0.05}(OH)_2$.

8. A nickel-based active material for a lithium secondary battery, obtained from the nickel-based active material precursor of claim 1.

9. A lithium secondary battery comprising:

a cathode comprising the nickel-based active material of claim 8;

an anode; and an electrolyte between the cathode and the anode.

10. A method of preparing a nickel-based active material precursor for a lithium secondary battery, the method comprising:

performing a first step of forming a porous core by reacting a mixture of a complexing agent, a pH regulator, and a metal raw material for forming a nickel-based active material precursor; and performing a second step of forming an exterior shell directly on the porous core of the first step, the exterior shell having a radially arranged structure and physically contacting the porous core with the exterior shell having a higher density than that of the porous core, wherein the exterior shell is an outermost layer of the nickel-based active material precursor, wherein a supply rate of the complexing agent and the metal raw material for forming a nickel-based active material precursor in the second step is reduced as compared to that in the first step, and wherein a porosity of the porous core is in a range of about 15% to about 30%.

* * * * *